US006937715B2

(12) United States Patent
Delaney

(10) Patent No.: US 6,937,715 B2
(45) Date of Patent: Aug. 30, 2005

(54) CONTACT CENTER MANAGEMENT

(75) Inventor: Paul J. Delaney, Athenry (IE)

(73) Assignee: Nortel Networks Limited, St. Laurent (CA)

( * ) Notice: Subject to any disclaimer, the term of this patent is extended or adjusted under 35 U.S.C. 154(b) by 324 days.

(21) Appl. No.: 10/255,269

(22) Filed: Sep. 26, 2002

(65) Prior Publication Data

US 2004/0062380 A1 Apr. 1, 2004

(51) Int. Cl.[7] .......................... H04M 3/00; H04M 5/00
(52) U.S. Cl. .............................. 379/265.09; 379/265.12
(58) Field of Search ..................... 379/265.02–265.05, 379/265.09, 265.12–265.14, 266.04, 309, 219, 220.01, 221.01; 370/352; 709/200, 201; 718/100, 105

(56) References Cited

U.S. PATENT DOCUMENTS

| 4,737,983 | A | | 4/1988 | Frauenthal et al. | |
|---|---|---|---|---|---|
| 5,787,163 | A | | 7/1998 | Taylor et al. | |
| 6,215,783 | B1 | | 4/2001 | Neyman | |
| 6,229,888 | B1 | * | 5/2001 | Miloslavsky | 379/265.01 |
| 6,373,836 | B1 | * | 4/2002 | Deryugin et al. | 370/352 |
| 6,687,241 | B1 | * | 2/2004 | Goss | 370/352 |
| 2001/0040887 | A1 | * | 11/2001 | Shtivelman et al. | 370/352 |
| 2003/0161463 | A1 | * | 8/2003 | Galvin | 379/265.01 |

FOREIGN PATENT DOCUMENTS

| EP | 1122937 A2 | 8/2001 |
|---|---|---|
| EP | 1126731 A1 | 8/2001 |

* cited by examiner

Primary Examiner—Benny Tieu
(74) Attorney, Agent, or Firm—Barnes & Thornburg

(57) ABSTRACT

A network of contact centres is managed by a network management server which allows contact centres (which may be independently run from one another) to register over the Internet or an intranet. Contacts received at a contact centre which is overly busy can be transferred to a different contact centre based on a determination made by the network management unit as to the most suitable agent in the network of contact centres. The network management unit receives events messages from the various contact centres as events occur which impact on the availability of individual agents. In this way, a dynamically updated database at the network management unit can determine the most suitable agent to which a contact should be transferred. The system allows independent contact centres to act as part of a larger network of contact centres without reducing the ability of a given centre to receive and handle contacts independently of one another.

16 Claims, 10 Drawing Sheets

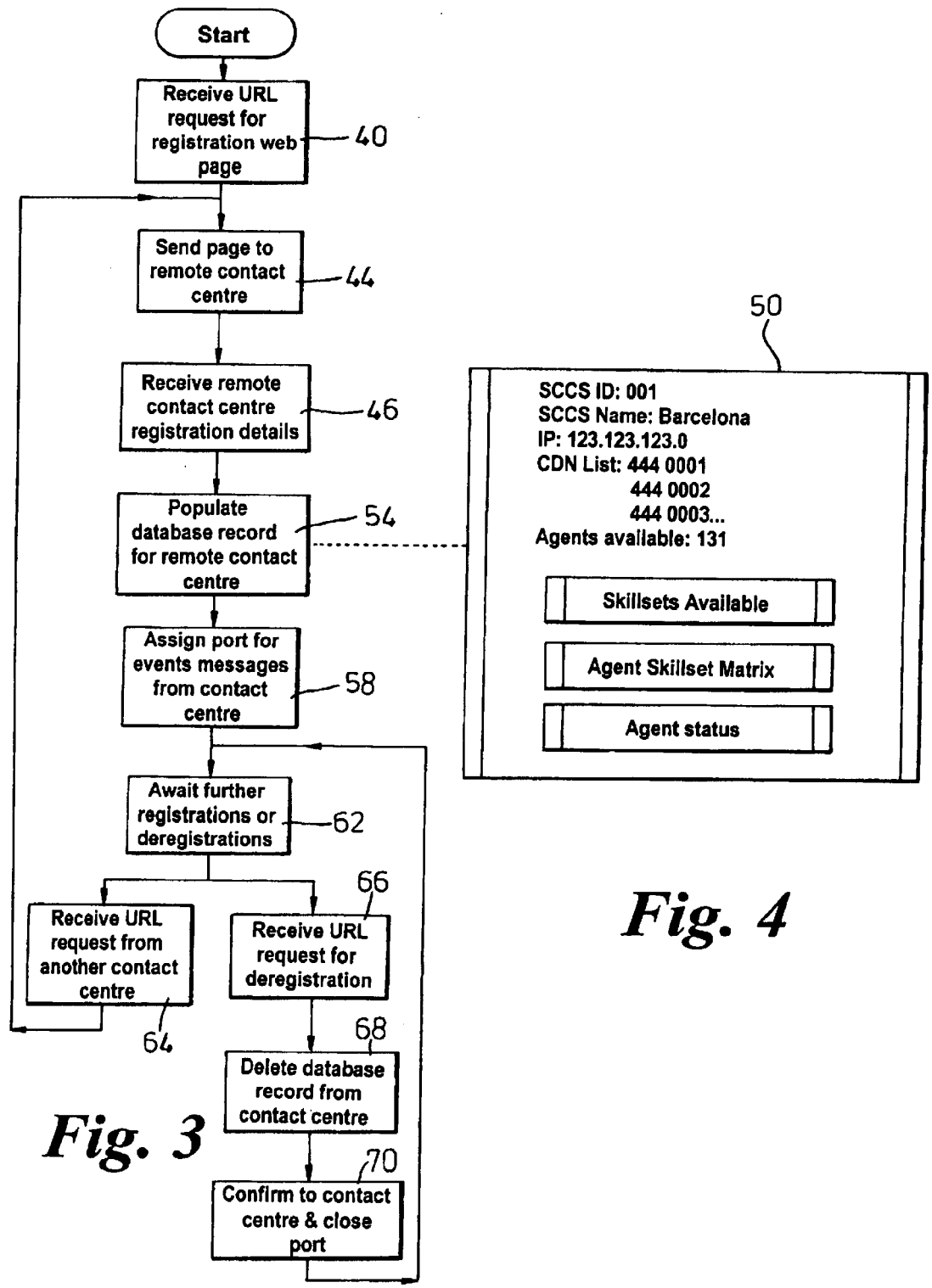

Skillsets Available:

- Languages: Spanish English French Japanese
- OS: Win2k WinNT Win98 Win 95 MacOS Linux
- Packages: MSOffice LotusNotes Claris
- Techissues: Ethernet Modems ISDN ADSL
- Manufacturers: Dell HP/Compaq Gateway

*Fig. 5*

Agent Status:

| ID | In/Out? | Ready? | Calls in Queue | Available in |
|---|---|---|---|---|
| 120 | In | No | 3 | 12 mins |
| 121 | In | No | 6 | 22 mins |
| 122 | Out | No | 0 | - |
| 123 | In | Yes | 4 | 13 mins |

*Fig. 7*

CONTACT CENTER MANAGEMENT

FIELD OF THE INVENTION

The present invention relates to methods and apparatus for managing contact centres in a network. The invention has particular application in managing call centres connected by a data network such as the Internet or a Wide Area Network (WAN).

BACKGROUND OF THE INVENTION

Contact centres are widely used to allow an enterprise or business to efficiently handle customer enquiries, complaints and support, and to allow an enterprise to make contact with existing or potential customers.

A widely recognised difficulty exists when contact centres cannot efficiently handle the volume of calls at any given time. (The term "calls" here is not intended to denote solely voice telephony calls as many contact centres provide multimedia communication between agents of the centre and customers or remote users, so that "calls" is intended to encompass voice and video calls, internet chat sessions, emails, short messaging service (SMS) messages and any other such communications between a remote user and an agent. Similarly, while the term "call centre" will be used interchangeably with "contact centre", it is to be understood that this is not a limitation on the type of contact centre to which the invention applies.)

A typical contact centre will have two main components, namely a network interface such as a switch or a private branch exchange (PBX) which handles the calls themselves, and a management component such as a contact centre server for controlling the operation of the PBX to direct calls to suitable agents. Thus, based on information gleaned from the call in its initial stages (e.g. from menu choices made in an interactive voice response (IVR) session), the contact centre server will determine a skillset which an agent would ideally require to handle the call. An agent is identified from those currently active at the centre, taking into account the number of calls currently on hold for that agent and other relevant data available to the contact centre server, and the PBX is directed to transfer the call to the directory number (DN) or the position ID of that agent by the contact centre server when the agent becomes free.

Nortel Networks provides a contact centre solution in which its Meridian PBX is associated with a Symposium Call Centre Server (SCCS). (Nortel, Meridian, Symposium and SCCS are trade marks.) The possibility currently exists to network a number of contact centres by providing an Internet (or other WAN) link between the respective SCCS units of different contact centres, and by providing telephony links (either dedicated ISDN (integrated services digital network) lines or links over the public switched telephone network (PSTN)) between the respective Meridian PBX units. A Networked Call Centre (NCC) server is also provided on the WAN to propagate to each SCCS the network address and routing tables for all of the other networked call centres.

Each SCCS unit therefore registers with the NCC server, and the NCC server defines and propagates the routing tables for each node to each other node. The NCC server then drops out of the process (though it may stay connected to the SCCS units to collect statistical information).

When a SCCS determines that it cannot efficiently handle a call to its associated PBX (either due to a lack of agents with the needed skillset, or to the centre being too busy), it may broadcast a message to each of the other SCCS units to determine if any other contact centre can take the call. If and when a response is received, the SCCS at the call centre to which the call was made instructs the Meridian PBX to transfer the call to the remote contact centre over the dedicated or public telephony link.

While this solution does allow a network of contact centres to make use of an overcapacity in one centre to relieve an overload at another centre, it is by no means an ideal solution. Among the problems with this solution are:

1. The first centre to reply will normally be allocated the call. Depending on the speed of network traffic between the remote centres, this node may simply receive the call because it is the first to reply, whereas a more suitable centre may be slower to respond and thus will not be allocated the call.
2. A remote centre may claim a contact to increase its turnover, but the call might be placed in a long queue after it is transferred to the remote centre, which leads to a worse overall service for the customer.
3. Conversely a contact centre might try to offload more than its fair share of calls, and transfer a call to a busier centre where the customer has a longer wait.
4. There is no way of telling which agent the call is to be transferred to, and the agent must be assigned to the Networked Skillset. If the originating centre is attempting to provide the best possible service to its own customers, it may therefore be reluctant to hand a call over to a remote centre.

U.S. Pat. No. 6,115,693 (McDonough et al., assigned to Andersen Consulting LLP) describes a virtual sales and service centre in which a plurality of call centres are connected to a "quality centre" which acts as a management point for all of the call centres. Calls are received centrally by the quality centre and then are distributed out to the individual call centres. In this system, all of the call centres are subordinate to the quality centre which tightly controls the operation of each centre. The intended result of this is that the network of call centres is presented as a unified resource to the customer.

U.S. Pat. No. 6,373,836 (Deruygin et al., assigned to Genesys Telecommunications Laboratories, Inc.) describes an IP telephony network centre which has a plurality of call centres managed by a central controller. The central controller accepts IP telephony calls and routes the calls to the call centres for distribution to agents of those centres. The call centres report statistical information to the central controller via a dedicated data link in such a way that in case of failure of a data link, the controller can still make educated guesses as to the status of the call centre.

In both the system of U.S. Pat. No. 6,115,693 and that of U.S. Pat. No. 6,373,836, the calls are centrally received and distributed. The individual call centres are tightly coupled to the central unit. While U.S. Pat. No. 6,373,836 contemplates the failure of a dedicated data link, neither system could function in the absence of the central unit, since this unit makes all of the decisions as to how calls should be routed.

Furthermore, because the networked centres are so tightly bound to the central unit, the systems are not designed to accommodate casual or freelance call centres being used to handle call overloads.

Cisco Systems provide a system called "Intelligent Contact Management" which is intended to manage and transfer contacts between different sites on a corporation. However, this product requires dedicated links between sites and is therefore unsuitable for use in integrating third-party or contract call centres into the network temporarily.

It is an object of the present invention to address the above disadvantages and provide a system and method of managing call centres which is more flexible in allowing calls to be transferred between independent contact centres than is the case in systems and methods known from the prior art.

SUMMARY OF THE INVENTION

The invention provides a method of managing a plurality of contact centres connected over a data network. This method includes the steps of:

a) providing an interface to allow contact centres connected to the data network to register with a network management unit;

b) the network management unit receiving registration data relating to a contact centre;

c) registering the contact centre when sufficient data is received;

d) storing status information relating to one or more agents at that contact centre; and e) receiving an events message from the contact centre and updating the agent status information for an agent accordingly;

so that the agent status information may be used to determine a suitable agent at the registered contact centre for handling a contact received at the same or a different registered contact centre.

The method of the invention enables a plurality of independent contact centres to act together as a network, for the purposes of transferring a contact received at one of the centres to another of the centres.

In contrast with the prior art described above, the contact centres are not directly controlled by the network management unit. Instead, the network management unit uses events messages from individual contact centres to track the status of agents within the centres registered at any given time.

When it is determined that a contact should be transferred (either by the contact centre itself requesting a transfer or the network management unit deciding that a transfer is advisable based on the skillset required for the contact or on load balancing considerations between contact centres, this agent status information allows the most suitable agent to be identified and the contact transferred. At other times, the contact centres can continue to operate independently of one another without any direction from the network management unit.

Additionally, by providing a readily available interface for registering with the network, contact centres can log onto and log off the network as it suits them best. Thus the individual contact centres are not tightly coupled to one another or to the network. In this way, the possibilities are increased for independent or freelance contact centres to choose which networks to log onto at any given time based on their current workload and the current resources available. For enterprise contact centres, advantages are to be found in the fact that other contact centres having the required skillsets can be encouraged to temporarily register with the network management unit to increase the overflow capacity of the contact centre network. This assists in providing "follow the sun" contact centre network characteristics.

Preferably, the interface is a web server providing a registration facility.

The step of registering a contact centre preferably involves assigning a communications port to the contact centre such that events messages are received via the port.

Steps b)-e) may be repeated for one or more further call centres so that the determination of a suitable agent can be made from among the agents of all contact centres registered at the time.

The method may also involve the further steps of:

f) receiving at the network management unit over the data network de-registration data relating to a contact centre;

g) de-registering the contact centre when sufficient data is received; and h) updating the agent status information for the agents of the de-registered contact centre by deleting or otherwise providing an indication that the agents are unavailable.

In this way, contact centres can join or leave the network of contact centres as their resources (and the amount of work available from the other centres on the network increases and decreases. The network management unit keeps track of the pool of available agents and their resources without requiring that the centres are part of a single enterprise or are joined by fixed or leased connections. This solution is thus particularly attractive to contact centres which contract out their services on a short- or medium-term basis.

The invention also provides a network management unit for managing a number of contact centres connected via a data network. Such a network management unit includes:

a) a connection to the data network;

b) a registration unit for receiving registration data relating to a number of contact centres connected to the network;

c) a memory for storing details of agents associated with registered contact centres;

d) an events monitor for receiving events notifications from a registered contact centre as events occur which impact on the availability of one or more agents at that contact centre;

e) an updating module for updating the details of the one or more agents based on the events notifications; and f) a resource allocation unit for determining, based on the stored agent details, a suitable agent for handling a contact received at one of the registered contact centres.

In another aspect there is provided a method of operating a contact centre, an this method involves:

a) contacting, over a data network, a contact centre network management unit;

b) providing to the network management unit registration details including information relating to the current status of agents at the contact centre;

c) providing to the network management unit messages of events impacting on the status of agents as such events occur;

d) receiving a contact transferred from another contact centre registered with the network management unit; and e) assigning the contact to an agent in accordance with instructions generated by the network management unit.

The invention also provides a method of handling a contact within a network of contact centres each connected via a data network to a network management unit, comprising the steps of:

a) receiving a contact at a first contact centre;

b) determining at the network management unit a suitable agent to handle the contact based on agent status data which is dynamically updated in the network management unit in accordance with events messages received from the contact centres on the network;

c) if the suitable agent is determined to be at a second contact centre different from the first contact centre, reserving the resources of that agent at the second contact centre;

d) transferring the contact from the first contact centre to the second contact centre; and e) presenting the contact to the suitable agent at the second contact centre.

Step b) may occur at the request of the first contact centre. Alternatively, step b) may occur as a result of an events message automatically generated by the first contact centre during the normal handling of the contact.

In a further aspect there is provided a contact centre network comprising:

a) a plurality of contact centres connected via a data network, each contact centre comprising:
  i) a contact handling unit for presenting a contact received at the contact centre to an agent of the centre or for transferring the contact to a remote contact centre;
  ii) a contact centre management unit for controlling the handling of contacts by the contact handling unit; and
  iii) an events message generator for generating and transmitting over the data network messages relating to events occurring at the contact centre which impact on the status of agents at the contact centre; and b) a network management unit connected to the data network, the network management unit including
  i) a memory for storing details of agents associated with the contact centres;
  ii) an events monitor for receiving events notifications from the contact centres as events occur which impact on the availability of one or more agents at the contact centre where the events occur;
  iii) an updating module for updating the details of the one or more agents based on the events notifications; and
  iv) a resource allocation unit for determining, based on the stored agent details, a suitable agent for handling a contact received at one of the contact centres.

whereby a contact received at a first one of the contact centres can be transferred to a second one of the contact centres based on a determination made by the resource allocation unit, and at the second of the contact centres, can be presented to the agent identified by the resource allocation unit.

The invention also provides a method of handling a contact at a contact centre connected via a data network to a network management unit, comprising the steps of:

a) receiving a contact from an external source;

b) determining whether resources exists at the contact centre to efficiently handle the contact;

c) if a determination is made that the contact cannot be handled efficiently, issuing a request to the network management unit to transfer the contact to a remote contact centre also connected to the network management unit;

d) receiving from the network management unit an instruction to transfer the contact the instruction including sufficient information for the contact centre to determine routing information to the remote contact centre; and e) using the routing information, transferring the contact to the remote contact centre.

The invention provides a computer program product comprising instructions in machine readable form which are effective when executed on a programmable apparatus associated with a network management unit connected to a data network to cause the network management unit to:

a) allow contact centres connected to the data network to register with the network management unit;

b) receive registration data relating to a contact centre;

c) register the contact centre when sufficient data is received;

d) store, for the registered contact centre, status information relating to one or more agents at that contact centre;

e) receive over the data network an events message from the contact centre and update the agent status information for an agent in accordance with information contained in the events message;

whereby the agent status information may be used by the network management unit to determine a suitable agent at the registered contact centre for handling a contact received at the same or a different registered contact centre.

The invention also provides a computer program product comprising instructions in machine readable form which are effective when executed on a programmable apparatus associated with a contact centre connected to a data network to cause the contact centre to:

a) contact, over a data network, a contact centre network management unit;

b) provide to the network management unit registration details including information relating to the current status of agents at the contact centre;

c) provide to the network management unit messages of events impacting on the status of agents as such events occur;

d) receive a contact transferred from another contact centre registered with the network management unit; and e) assign the contact to an agent in accordance with instructions generated by the network management unit.

The invention further provides a computer program product comprising instructions in machine readable form which are effective when executed on a programmable apparatus associated with a contact centre connected to a data network to cause the contact centre to:

a) receive a contact from an external source;

b) determine whether resources exists at the contact centre to efficiently handle the contact;

c) if a determination is made that the contact cannot be handled efficiently, issue a request to the network management unit to transfer the contact to a remote contact centre also connected to the network management unit;

d) receive from the network management unit an instruction to transfer the contact the instruction including sufficient information for the contact centre to determine routing information to the remote contact centre; and e) use the routing information, transferring the contact to the remote contact centre.

BRIEF DESCRIPTION OF DRAWINGS

The invention will now be illustrated by the following descriptions of embodiments thereof given by way of example only with reference to the accompanying drawings, in which:

FIG. 3 is a flow chart illustrating the method steps involved in registering a contact centre on the network in accordance with an embodiment of the invention;

FIG. 4 is an illustration of the information in a database record generated in the method of FIG. 3;

FIGS. 5, 6 and 7 provide additional detail regarding the information recorded in components of the record of FIG. 4;

DETAILED DESCRIPTION OF PREFERRED EMBODIMENTS

Figure 1:
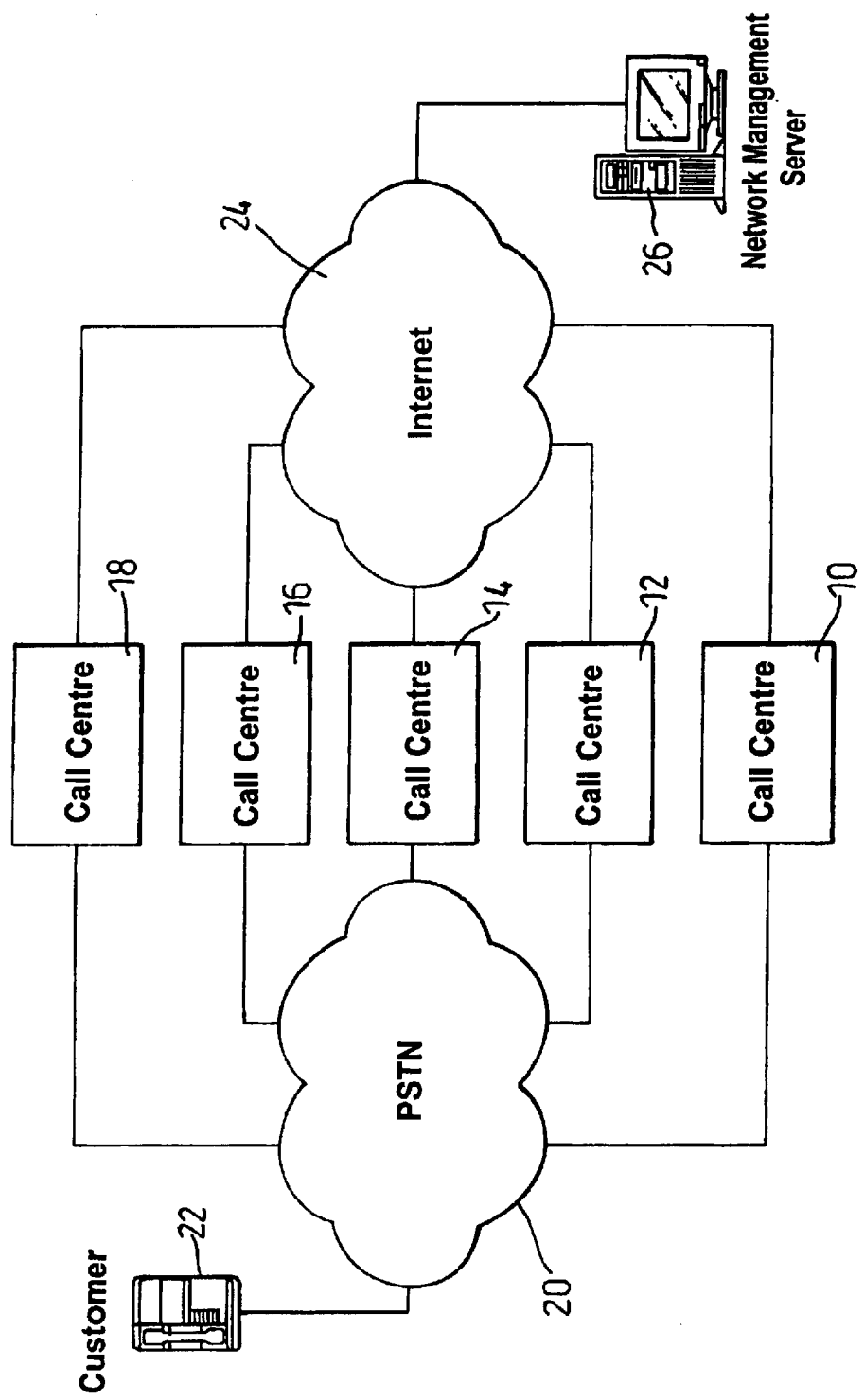
FIG. 1 is a network architecture of a contact centre network according to an embodiment of the invention.

FIG. 1 shows a network architecture according to the invention. A plurality of contact centres (or call centres, the terms being used interchangeably herein) 10, 12, 14, 16, 18 are connected to the public switched telephone network (PSTN) 20. Any call centre can be accessed by a customer using a telephone 22 to dial a telephone number for that particular contact centre. In general the customer will call the contact centre for which contact details are most readily available, or the contact centre which is closest geographically (to minimise call charges).

The contact centres may be part of the same overall enterprise (e.g. being dedicated contact centres in different geographical sites belonging to a single company), or some or all of them may be independent from one another. To illustrate the invention, it may be assumed that the customer wishes to receive technical support from a company and that contact centre 10 is the only contact centre run by that company. All of the other contact centres are independent from centre 10 and from one another. Accordingly, when the customer seeks technical support, contact centre 10 will be called.

Each contact centre 10–18 is also connected to the internet 24 (or to some other wide area data network). Finally, a network management server 26, the function of which will be described in detail below, is also connected to the internet 24.

Network management server 26 is shown as being a distinct entity from each contact centre, but in practice, it may be located in and run by the contact centre 10.

Figure 2:
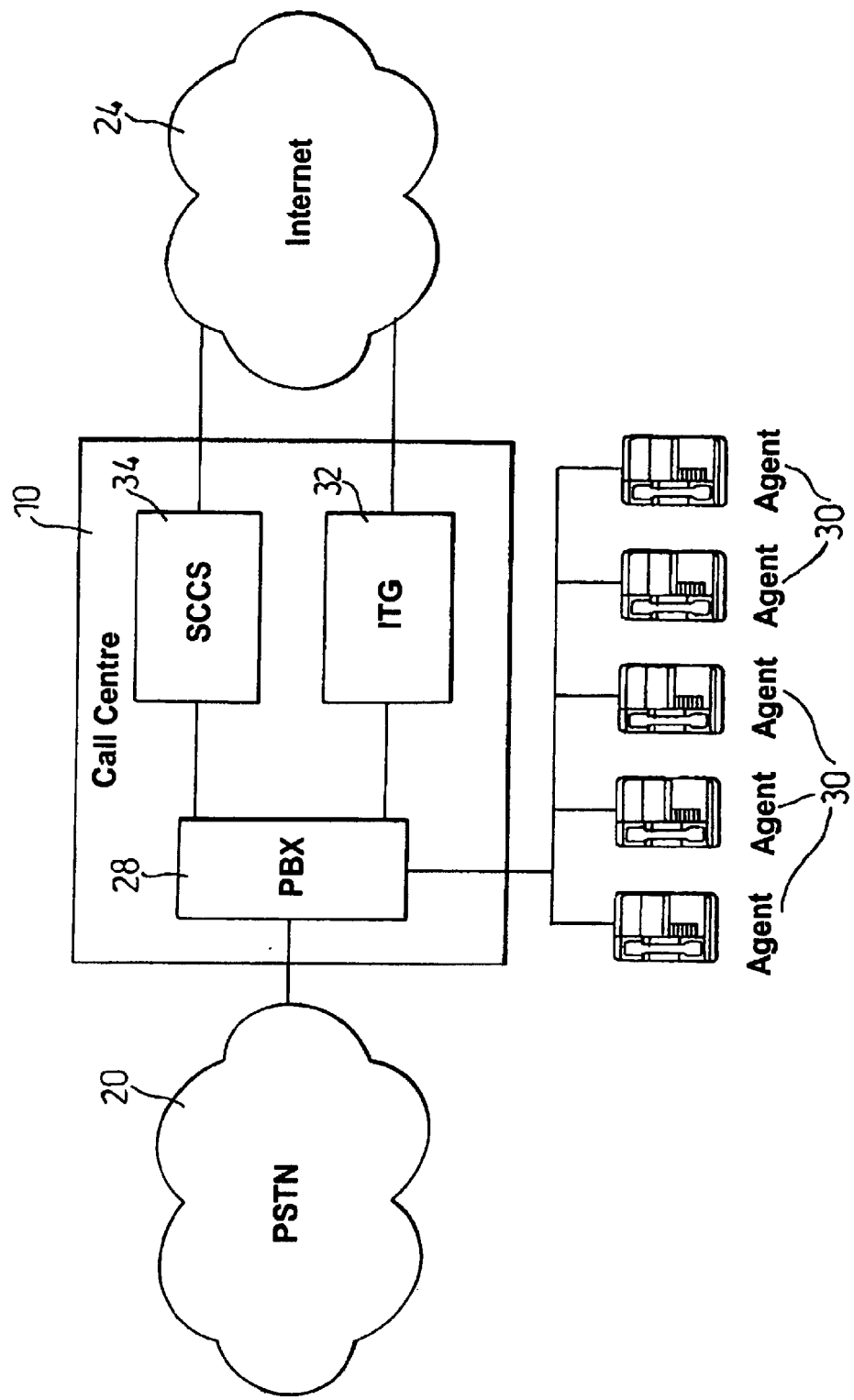
FIG. 2 is a block diagram of the main components of a contact centre according to an embodiment of the invention.

As illustrated in FIG. 2, each call centre includes a private branch exchange (PBX) 28 which is connected to the PSTN 20 to receive and handle calls in known manner. A plurality of agents 30 are connected to the PBX to deal with customer calls (or contacts of other media types). A suitable PBX is the Meridian exchange from Nortel Networks, which will be familiar to the person skilled in the art.

An internet telephony gateway (ITG) 32 connects the PBX 28 to the Internet 24, allowing the PBX to receive VoIP (voice over internet protocol) calls from the Internet, and allowing agents to make calls using VoIP technology.

A contact centre server (in this case the Symposium Call Centre Server or SCCS) 34 is also integrated in the contact centre. The SCCS 34 oversees and manages the running of the contact centre 10, by instructing the PBX to transfer calls to suitable agents based on skillsets (which may be determined by passing the call through an IVR unit in the PBX), presenting agents with call information, managing agent queues, etc. Again, the conventional operation of the SCCS and its interaction with the Meridian PBX is well known in the art.

SCCS 34 is also connected to the Internet 24, to allow communication with the network management server 26 (FIG. 1).

The network management server 26 (FIG. 1) enables a network of contact centres to be dynamically created and managed, even where the contact centres are in fact independent entities. Typically an enterprise requiring dependable contact centre functioning (e.g. to provide reliable customer support) will manage its own network management server. Thus, in the illustrated embodiment, the enterprise to which contact centre 10 belongs will provide the network management server as an auxiliary component of centre 10. Network management server 26 provides a point of contact on the internet to enable other contact centres 12, 14, 16, 18 having the requisite attributes to offer their services to contact centre 10. Contact centre 10 can then use these centres as an overflow.

Even where all of the contact centres 10–18 are part of the same enterprise, the network management server allows the various centres to co-operate better and to provide higher customer service levels.

The network management server operates by allowing contact centres to register as illustrated in FIG. 3. The server 26 has a published web page which an administrator of a contact centre can access to register. By password protecting this page, access can be limited to approved contact centres (e.g. those with which contact centre 10 has a service agreement). Alternatively, without using a web page, a remote access program can be provided by the server 26 which can only be accessed by a client program in an approved remote contact centre. For ease of understanding the embodiment employing a web page will be described.

Figure 8:
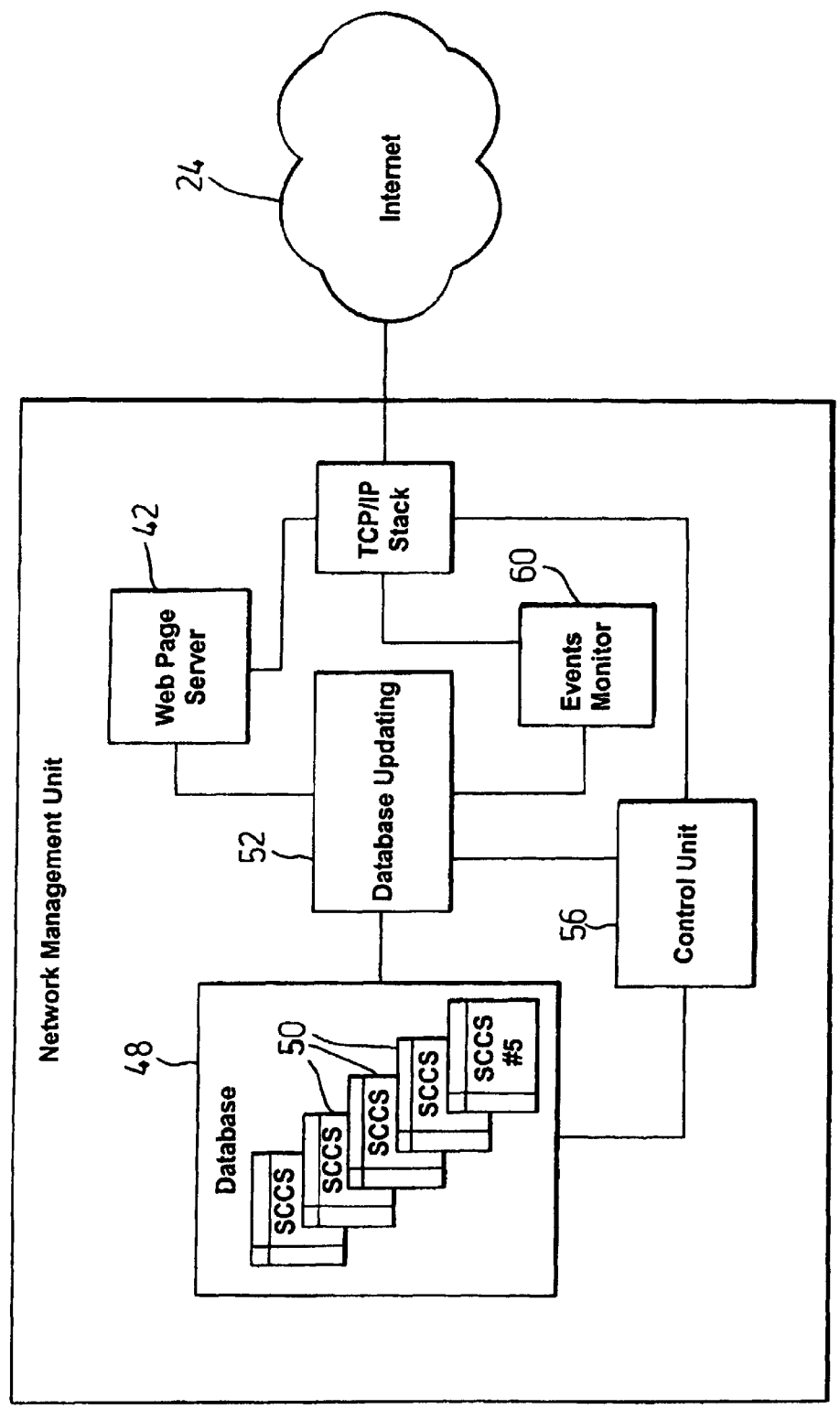
FIG. 8 is a block diagram of the main components of a network management unit according to the invention.

The network management server 26 includes a web page server function. One or more pages are provided by the web server at a known web address. When a remote contact centre wishes to register, the uniform resource locator (URL) of the registration page is requested, step 40, from the web page server 42 (see FIG. 8 for details of the components of the network management server 26). The page is sent to the remote centre, step 44, and is loaded into a browser at the desktop of the administrator of the remote contact centre. The page contains fields in a form for inputting the information required to register the site, and when this form is filled in, and sent back, the web server receives the registration details, step 46. (Again, this process can, and most probably will, be automated in many cases. If the centre has previously registered, then many of the details, which will not change from day to day, will be already available to the network management server.)

The network management server (see FIG. 8) has a database 48 in which records 50 are stored for each registered call centre server. A database updating function 52 uses the information received at the web server to populate a record for the remote call centre, step 54. The record 50 (see FIG. 4) includes details identifying the call centre, the IP or network address of the call centre, a list of controlled directory numbers (CDNs) at which calls arrive at the remote contact centre, a total number of agents available at the centre, details of the aggregate skillsets at the call centre, the particular skillset matrices for the individual agents of the centre, and a current status of each agent.

The network management server includes a control unit 56 which authorises the database to be updated (e.g. after conducting a records check to ensure that the centre is competent to receive calls). The control unit then assigns a port, step 58, for communication between the remote contact centre and an events monitoring function 60. This function listens at that port for events messages from that particular remote contact centre. Such events will generally relate to actions taken by agents at the remote contact centre and will impact on the availability of individual agents to receive calls, or to events such as new contacts arriving or treatments being offered to contacts. Accordingly, these events are communicated to the database updating function which amends the record as appropriate. This will be described in more detail below.

Referring back to FIG. 3, this completes the basic registration function, following which the web server awaits further registrations or deregistrations (e.g. when a registered contact centre becomes inactive at the end of a work shift), step 62. If a URL request for the registration page is received from another remote contact centre, step 64, the process reverts to step 44.

If a deregistration request is received, step 66, then the database record is deleted for that contact centre (possibly after archiving reusable information for future use), and a confirmation message is sent to the remote contact centre and the port is closed at the events monitor, step 70.

FIG. 5 shows an example of an aggregate skillset subrecord 72 within record 50. In this simplified example, the skillsets relate to computer technical support, and the skillset therefore lists every language spoken 74 by at least one agent at the remote contact centre. It also lists all operating systems 76, relevant software packages 78, particular technical issues 80 and computer manufacturers 82 for which there is an agent with the relevant skills to handle queries.

Figure 6:
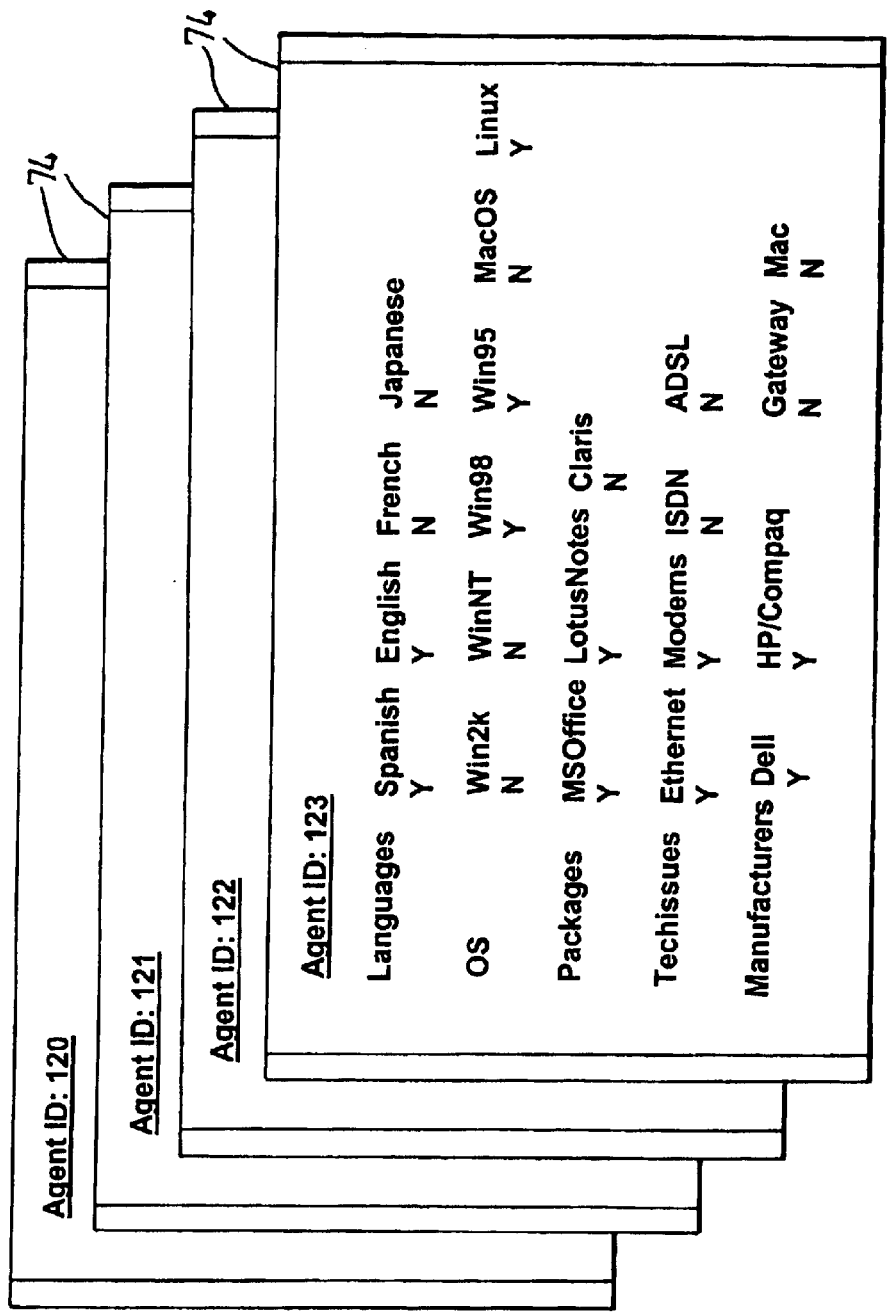

A similar simplified example is given in FIG. 6 of the skillset matrix for an individual agent at the contact centre. Each agent has an associated skillset matrix sub-record 74. In the case of each possible skill, an indicator ("Y" or "N") is provided to denote whether or not that particular agent has the relevant expertise. Instead of a simple Yes/No rating, the proficiency of the agent with each skill could be provided, but this is not shown in the figure.

When the network management server is seeking to transfer a call to a remote contact centre, it can therefore first examine the aggregate skillset record for each registered centre to determine which centres possess all necessary skills. Then within each such contact centre a shortlist of suitable agents can be drawn up. At this point, the most suitable agent can be determined from the shortlist of suitable agents across the various centres, using the agent status sub-records of FIG. 7 and also by using statistics like longest idle time.

FIG. 7 shows a simplified illustration of a portion of an agent status sub-record 76 for a particular remote contact centre. For each agent, the sub-record notes if the agent is logged in or out, whether the agent status is ready or not ready (to take a new contact), how many queued calls have already been assigned to that agent, and the estimated time in which the agent is expected to become available. It should be noted that Agent No. 123 is shown as being ready despite having calls queued; Agents are normally given a short break between calls, and a particularly important call could be directed immediately to that agent ahead of the other queued calls, if so desired.

Thus, if a number of agents are considered equally skilled to handle a call, then the agent status records allow the network management server to arrive at a determination of the most available agent from this subset. Alternatively, the determination of the most suitable agent can involve a trade-off between differing skill levels and differing availabilities.

Figure 9:
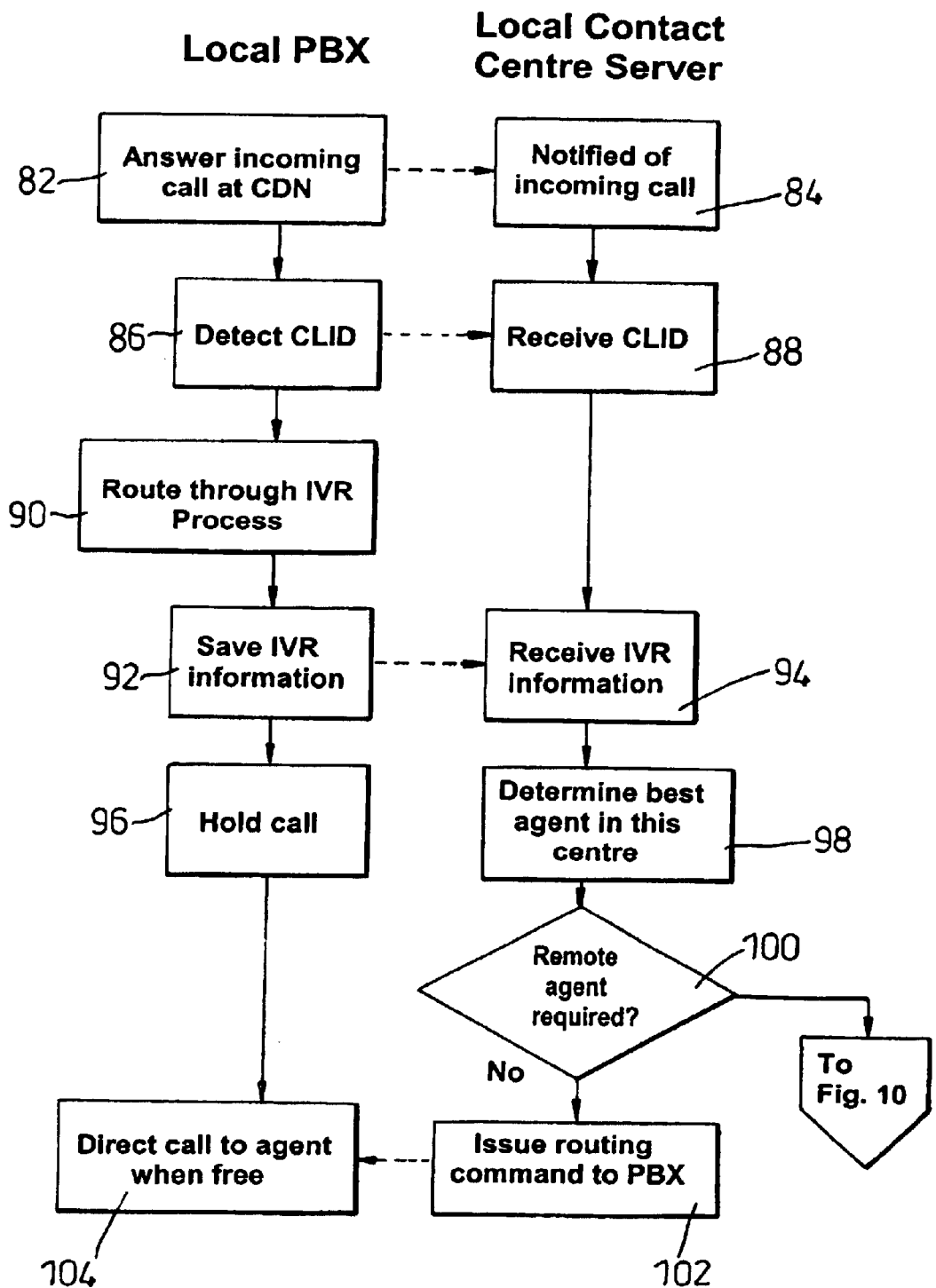
FIG. 9 is a flow chart illustrating the initial steps in the handling of a call received at the contact centre of FIG. 2, according to an embodiment of the invention.

The manner in which this determination of a suitable agent is used will be described below in relation to a call arriving at an overloaded call centre. FIG. 9 shows how a call is handled when it arrives directly at the call centre 10. The call is made to a particular number associated with this call centre, and thus it arrives over the PSTN and is answered by the PBX, step 82. The SCCS of call centre 10 is immediately notified, step 84, of the incoming call as it monitors the CDNs of the PBX for incoming calls.

The PBX has a calling line identification (CLID) unit which can determine, step 86, the number from which the call has originated. As this can be used in determining the skillset, it is notified to the SCCS in step 88 (e.g. the priority assigned to the customer will generally have an impact on skillset, and the CLID can be used to recognise high or low priority customers). To further clarify the required skillset, the call will typically be routed through an IVR process, step 90. This process allows the customer to traverse a decision tree using dial tone, voice, or other inputs in response to recorded prompts, and the path taken through this tree may result in information which is saved in step 92 and is passed to the SCCS, step 94, to decide on a skillset.

The PBX will then hold the call, step 96, while the SCCS determines the most suitable agent in the contact centre, step 98, to handle the call. If all suitable agents are busy and are likely to remain so for more than a threshold period (the exact criteria will vary according to circumstances), a decision is taken, step 100, whether to seek a remote agent to handle the call. If no remote agent is required, then the SCCS issues a routing command, step 102, to the PBX which identifies the local agent to whom it has decided to assign the call. The call remains queued until the agent in question becomes available, at which point the PBX transfers the call, step 104.

Figure 10:
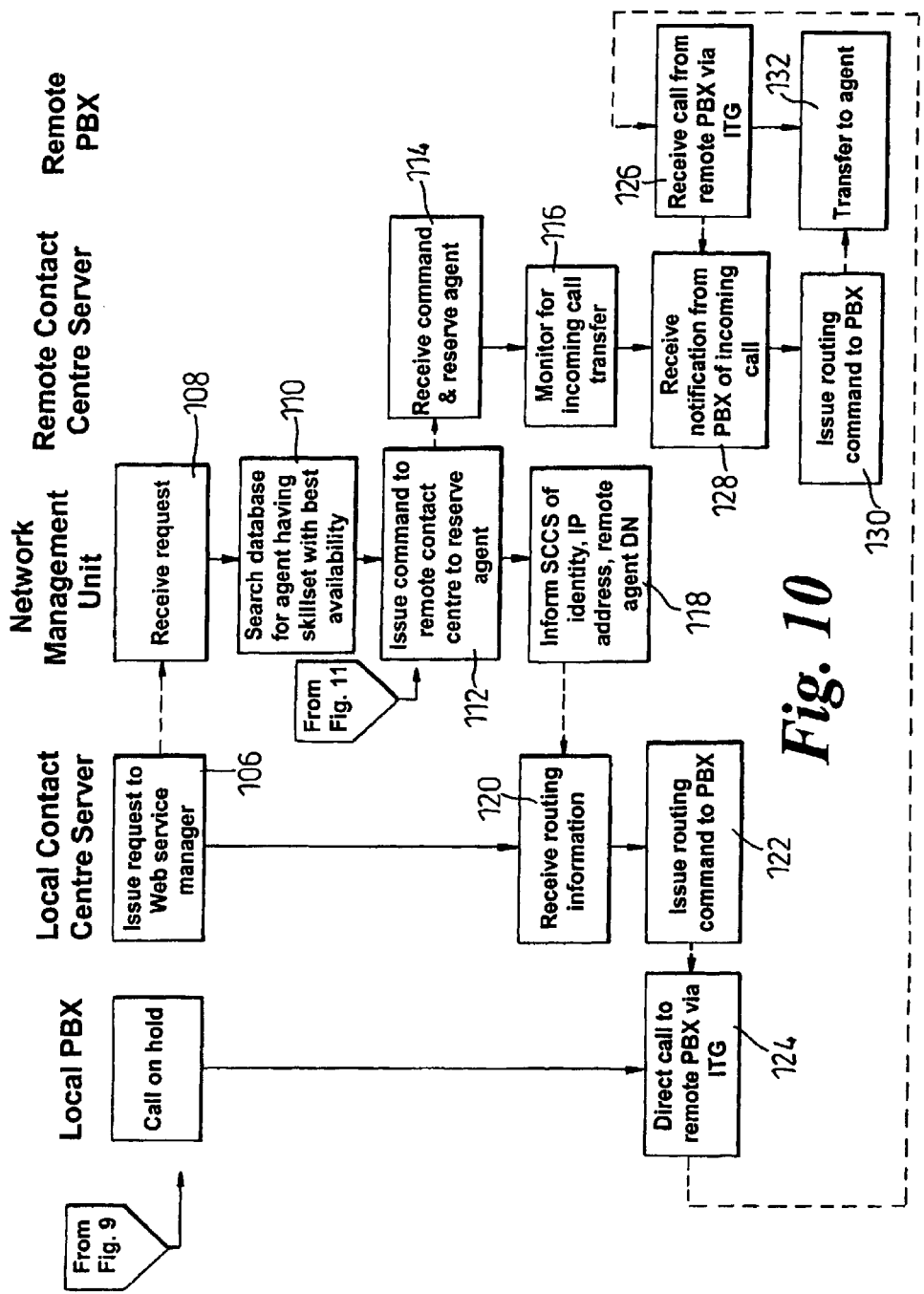
FIG. 10 is a flow chart illustrating the further handling of the call, following on from FIG. 9.

If, on the other hand, it is decided in step 100 that the call might be better handled remotely due to a lack of resources locally, then the process proceeds to FIG. 10.

At the beginning of FIG. 10, the call is on hold at the local PBX (where it was received initially). The SCCS associated with that PBX, having decided in step 100 to seek a remote agent, issues in step 106 a remote agent request via the Internet/intranet to the network management unit. This request includes all skillset information associated with the call, to enable the network management unit to determine the most suitable agent. It may also include an indication of the expected delay to handle the call locally (allowing the network management unit to instruct the local SCCS that no more suitable agent is available if the delay at each remote centre is expected to be at least as long).

Accordingly, when the network management unit receives the request, it first compares the skillset requirements of the call with the aggregate skillset for each remote contact centre. For those contact centres which appear to be able to handle the call, it then conducts an agent skillset matrix search, drawing up a shortlist of agents (who may be in different remote centres from one another). As previously described, the skill levels and the agent status are then taken into account to determine a best match, step 110.

The network management unit issues a command via the internet to the SCCS at the remote centre where this agent is based, step 112, instructing it to reserve a place in the agent's queue for the call (if the call is of particularly high priority, the instruction can be to reserve a place at the top of the queue). The remote SCCS will reserve the agent as instructed, step 114, and then monitor for the incoming call, step 116.

The network management unit, optionally after receiving confirmation that the agent has been reserved by the remote SCCS, contacts the local SCCS via the internet with a message identifying the remote contact centre, the IP address of the remote contact centre, and the directory number of the reserved agent, step 118. When the local SCCS receives this routing information, step 120, a routing command is issued, step 122, to the local PBX, instructing it to transfer the call, step 124, via the internet to the PBX at the remote IP address with an identification of the position id.

It should be noted at this point that the call could be transferred over the PSTN or using a dedicated telephony link such as a leased ISDN line between the respective PBXs. However, as regards the latter option, this is unlikely to be available when the remote PBX is a "freelance" call centre which operates independently of the local call centre.

When the call is received by the remote PBX, step 126, the remote SCCS receives notification of this event, step 128. It issues a routing command to the PBX, step 130, to direct the call to the previously determined agent, confirming the instruction regarding the destination directory number as included with the call. The PBX holds the call until the agent is free and then releases it to the agent, step 132.

In the background behind these call handling steps, all of the contact centres 10–18 will be dealing with a multitude of other calls, and the status of the agents will be changing for other reasons, such as work breaks, making outgoing calls, shifts finishing, etc.

In order to keep the agent status sub-records up to date, each SCCS transmits periodic statistical updates (e.g. in XML (extensible mark-up language) format, and also transmits events messages, also in XML format.

The statistical updates can include:
1. Total number of agents configured for call centre
2. Number of agents currently logged in
3. Number of agents active
4. Number of agents ready/not ready
5. Total number of contacts in queue
6. Longest wait time of queued contacts
7. Number of contacts connected
8. Number of contacts on hold The events can include:
1. Agent logs in
2. Agent logs out
3. Agent goes ready
4. Agent goes not ready
5. Agent on hold
6. Agent reserved
7. Contact arrived
8. CLID of new contact
9. Contact presented
10. Contact abandoned
11. Contact re-queued to different skillset For example, referring to the agent status record of FIG. 7, it was noted previously that Agent #123 was ready but had calls in queue. If the agent answers the next call in the queue, an events message will issue from the SCCS to the network management unit to indicate that Agent #123 has gone "not ready", and that the contact in question has been presented to the agent. The XML message can also include a revised estimate of when the agent is expected to become free (this estimate overwriting the previous estimate and being counted down automatically by updating all agent records every minute). The database updating function therefore changes the status of Agent #123 to "not ready" with three calls in queue, and the new estimate of time to become free.

By receiving the statistical information, the working information of the network management unit can be periodically corrected against that of the call centre to which it relates.

More importantly, however, is the fact that the events messages allow the network management unit to update the individual status of each agent in real time, so that when a decision has to be taken regarding the routing of a call, the best possible information is available, which matches the real-time situation. By implementing this using web-based events messages relating to each event as it happens, it is possible for the contact centres to operate as efficiently as a tightly bound network under a single controller. In reality, however, each centre is free to operate independently, and apart from receiving instructions to take the occasional call from another centre (which can of course be refused), the centres will operate as independent ventures.

The invention is thus particularly useful for "freelance" contact centres which lease their services temporarily or periodically to other enterprises, or which assign a portion of their agents to other contact centres. Such a freelance contact centre can be working on other projects but can register according to the invention with an enterprise's networks of contact centres, temporarily if desired. Since only those agents with the necessary skillsets will be considered for call transfers by the network management unit, and since the status of these agents is updated in the network management unit as events messages are received, it is only when the agents are not overly busy that calls will be transferred. In this way, the freelance centre can take advantage of the overcapacity of the enterprise's contact centre to increase the activity of its agents when they are not busy, but when they are busy, the freelance centre can operate with its own full capacity. It should be added here that a remote contact centre can (depending on the terms of any service agreements) refuse to take call transfer instructions from the network management unit. The network management unit will then assign the call to the next most suitable agent or instruct the originating centre to deal with the call. It can also make routing decisions based on previous experience, or on the basis of service level agreements to e.g. limit the overall number of contacts per quarter.

Figure 11:
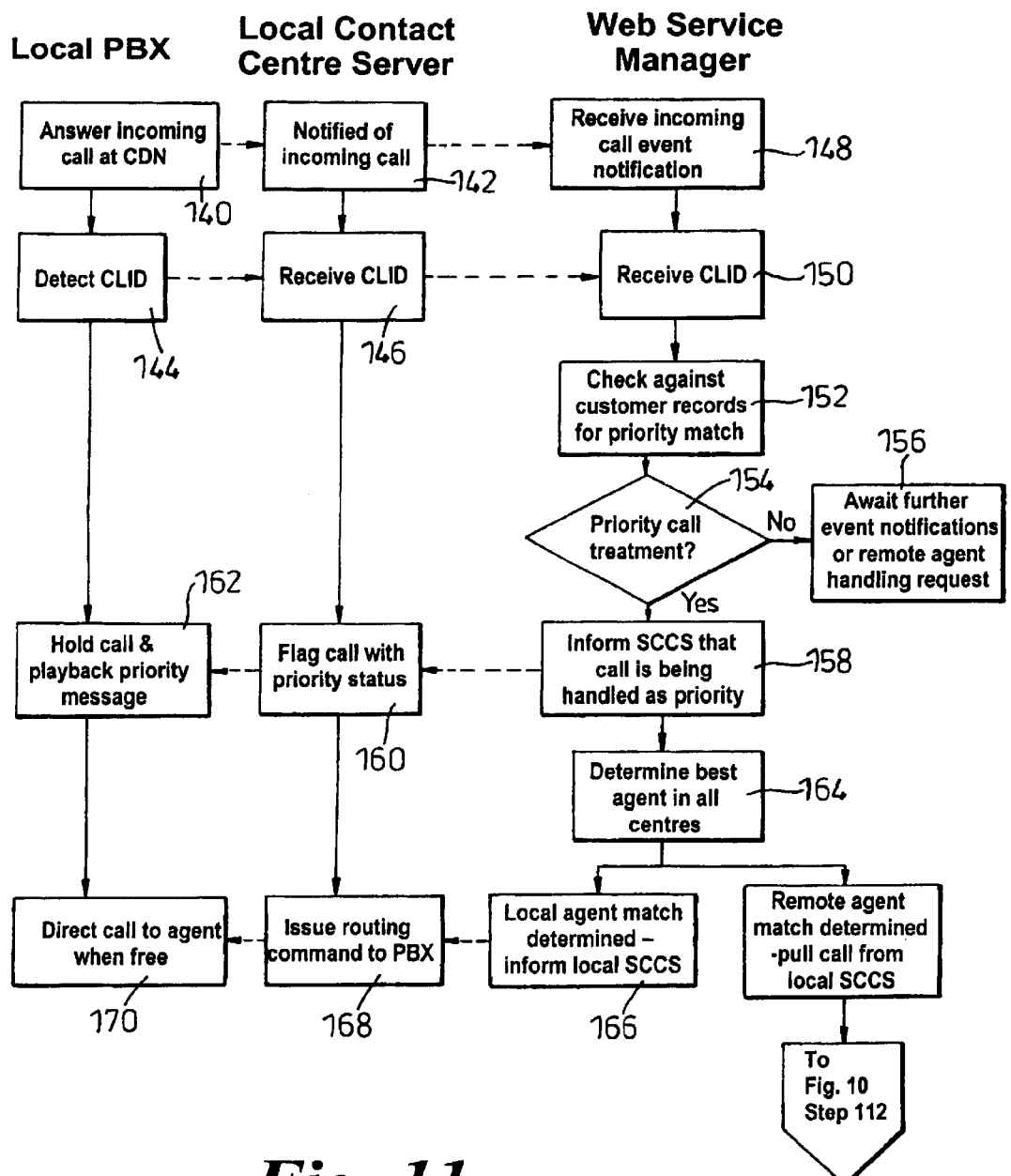
FIG. 11 is a flow chart illustrating the handling of a call received at the contact centre of FIG. 2, according to a further embodiment of the invention.

In the embodiment described above, the decision to request a remote agent is taken by the contact centre which received the call. The possibility also exists for the network management unit to unilaterally decide to pull a contact from a contact centre and to assign it to an agent in a different contact centre. An example of when this might occur is if the incoming contact is recognised as being of high importance. FIG. 11 describes the operation of this method.

When a call is answered, step 140, at a PBX of the "local" contact centre (using the terminology of local and remote centres as above to distinguish between the centre where a call is first received and the other registered centres), it is notified to the local SCCS, step 142, the CLID is detected, step 144, and this is also notified to the local SCCS, step 146, as in the previous embodiment. The answering of the call and the received CLID both generate events notified to the network management unit, steps 148, 150. In this embodiment, the network management unit is configured with a database of "gold customer" CLIDs, i.e. originating numbers of callers who should be treated with high priority. Every time a CLID event message is received, the network management unit compares the CLID with this database, step 152, and decides whether to provide priority treatment for the call, step 154.

Using the CLID is not the only method for the network management unit to decide to treat the call with priority. For example a gold customer might ring from a different number than usual, but the IVR process might generate data identifying the customer as a gold customer (e.g. if the IVR system prompts users to input a unique ID), and this data could be transferred as an event message to the network management unit, irrespective of whether the local SCCS has decided to request a remote agent.

If the customer is not to be treated with high priority, step 156, the network management unit awaits further event notifications or explicit requests for remote handling.

If however the call is determined as being a high priority call, step 158, this fact is first notified to the SCCS, which flags the call as such, step 160, and instructs the PBX to hold the call and play back a recorded message indicating to the customer that the call will be directed to an agent immediately, bypassing the normal queue, step 162. Because the CLID check can be done very quickly (indeed the CLID is available to the PBX even before the call is answered, and can be sent to the network management unit at that stage), steps 152, 154, 158 and 160 can occur even before the call enters the normal IVR process, or if the call has entered that process it can be pulled out of IVR and the required message played in step 162.

While the message is being played, the network management unit determines which agent, across all of the registered centres on the network (including the local centre), is best equipped to handle the call, step 164. Perhaps only certain agents will have a skillset including "gold customer handling ability", and of these, the most suitable might be the agent who last dealt with the call, or whichever agent is currently "ready" (since the call can then be moved to the top of that agent's queue and answered instantly).

If the best agent is at the local centre where the call is being held, this agent is identified to the local SCCS, step 168, which issues the necessary routing command to the PBX, step 168, to route the call to the identified agent once the agent becomes free (normally bypassing that agent's queue), step 170.

If a remote agent is determined as being the most suitable match, step 172, the call is pulled from the local centre and transferred to the remote centre where this agent is located. Suitably, this can be done using the process of FIG. 10 beginning at step 112, with the only difference being that the remote SCCS is informed that the customer is a gold customer and thus that the call should be placed at the top of the identified agent's queue.

The invention is not limited to the specific embodiments described above which can be modified or departed from within the scope of the invention.

What is claimed is:

1. A method of managing a plurality of contact centres connected over a data network comprising the steps of:
   a) providing an interface to allow contact centres connected to the data network to register with a network management unit;
   b) receiving at the network management unit over the data network registration data relating to a contact centre;
   c) registering the contact centre when sufficient data is received;
   d) storing, for the registered contact centre, status information relating to one or more agents at that contact centre;
   e) receiving over the data network an events message from the contact centre and updating the agent status information for an agent in accordance with information contained in the events message;
   whereby the agent status information may be used by the network management unit to determine a suitable agent at the registered contact centre for handling a contact received at the same or a different registered contact centre.

2. A method as claimed in claim 1, wherein said interface is a web server providing a registration facility.

3. A method as claimed in claim 1, wherein the step of registering a contact centre comprises assigning a communications port to the contact centre such that events messages are received via said port.

4. A method as claimed in claim 1, further comprising repeating steps b)-e) for one or more further call centres whereby the determination of a suitable agent can be made from the agents of all contact centres registered at the time.

5. A method as claimed in claim 1, further comprising the steps of:
   f) receiving at the network management unit over the data network de-registration data relating to a contact centre;
   g) de-registering the contact centre when sufficient data is received;
   h) updating the agent status information for the agents of said de-registered contact centre by deleting or otherwise providing an indication that said agents are unavailable.

6. A network management unit for managing a plurality of contact centres connected via a data network, the unit comprising:
   a) a connection to the data network;
   b) a registration unit for receiving registration data relating to a plurality of contact centres connected to said network;
   c) a memory for storing details of agents associated with registered contact centres;
   d) an events monitor for receiving events notifications from a registered contact centre as events occur which impact on the availability of one or more agents at that contact centre;
   e) an updating module for updating the details of said one or more agents based on said events notifications; and
   f) a resource allocation unit for determining, based on the stored agent details, a suitable agent for handling a contact received at one of said registered contact centres.

7. A method of operating a contact centre, comprising the steps of:
   a) contacting, over a data network, a contact centre network management unit;
   b) providing to said network management unit registration details including information relating to the current status of agents at the contact centre;
   c) providing to the network management unit messages of events impacting on the status of agents as such events occur;

d) receiving a contact transferred from another contact centre registered with the network management unit; and e) assigning the contact to an agent in accordance with instructions generated by the network management unit.

8. A method as claimed in claim 7, wherein said events include an event selected from:
- i. Agent logs in
- ii. Agent logs out
- iii. Agent goes ready
- iv. Agent goes not ready
- v. Agent on hold
- vi. Agent reserved
- vii. Contact arrived
- viii. CLID of new contact
- ix. Contact presented
- x. Contact abandoned
- xi. Contact re-queued to different skillset.

9. A method of handling a contact within a network of contact centres each connected via a data network to a network management unit, comprising the steps of:

a) receiving a contact at a first contact centre;

b) determining at said network management unit a suitable agent to handle said contact based on agent status data which is dynamically updated in the network management unit in accordance with events messages received from the contact centres on the network;

c) if the suitable agent is determined to be at a second contact centre different from the first contact centre, reserving the resources of that agent at the second contact centre;

d) transferring the contact from the first contact centre to the second contact centre; and e) presenting the contact to the suitable agent at the second contact centre.

10. A method of handling a contact as claimed in claim 4, wherein step b) occurs at the request of the first contact centre.

11. A method of handling a contact as claimed in claim 4, wherein step b) occurs as a result of an events message automatically generated by the first contact centre during the normal handling of the contact.

12. A contact centre network comprising:

a) a plurality of contact centres connected via a data network, each contact centre comprising:
  - i) a contact handling unit for presenting a contact received at the contact centre to an agent of the centre or for transferring the contact to a remote contact centre;
  - ii) a contact centre management unit for controlling the handling of contacts by the contact handling unit; and
  - iii) an events message generator for generating and transmitting over the data network messages relating to events occurring at the contact centre which impact on the status of agents at the contact centre; and b) a network management unit connected to the data network, said network management unit including
  - i) a memory for storing details of agents associated with said contact centres;
  - ii) an events monitor for receiving events notifications from said contact centres as events occur which impact on the availability of one or more agents at the contact centre where the events occur;
  - iii) an updating module for updating the details of said one or more agents based on said events notifications; and
  - iv) a resource allocation unit for determining, based on the stored agent details, a suitable agent for handling a contact received at one of said contact centres.

whereby a contact received at a first one of said contact centres can be transferred to a second one of said contact centres based on a determination made by the resource allocation unit, and at the second of said contact centres, can be presented to the agent identified by the resource allocation unit.

13. A method of handling a contact at a contact centre connected via a data network to a network management unit, comprising the steps of:

a) receiving a contact from an external source;

b) determining whether resources exists at the contact centre to efficiently handle the contact;

c) if a determination is made that the contact cannot be handled efficiently, issuing a request to the network management unit to transfer the contact to a remote contact centre also connected to the network management unit;

d) receiving from the network management unit an instruction to transfer the contact said instruction including sufficient information for the contact centre to determine routing information to the remote contact centre; and e) using said routing information, transferring the contact to said remote contact centre.

14. A computer program product comprising instructions in machine readable form which are effective when executed on a programmable apparatus associated with a network management unit connected to a data network to cause the network management unit to:

a) allow contact centres connected to the data network to register with the network management unit;

b) receive registration data relating to a contact centre;

c) register the contact centre when sufficient data is received;

d) store, for the registered contact centre, status information relating to one or more agents at that contact centre;

e) receive over the data network an events message from the contact centre and update the agent status information for an agent in accordance with information contained in the events message;

whereby the agent status information may be used by the network management unit to determine a suitable agent at the registered contact centre for handling a contact received at the same or a different registered contact centre.

15. A computer program product comprising instructions in machine readable form which are effective when executed on a programmable apparatus associated with a contact centre connected to a data network to cause the contact centre to:

a) contact, over a data network, a contact centre network management unit;

b) provide to said network management unit registration details including information relating to the current status of agents at the contact centre;

c) provide to the network management unit messages of events impacting on the status of agents as such events occur;

d) receive a contact transferred from another contact centre registered with the network management unit; and e) assign the contact to an agent in accordance with instructions generated by the network management unit.

16. A computer program product comprising instructions in machine readable form which are effective when executed on a programmable apparatus associated with a contact centre connected to a data network to cause the contact centre to:

a) receive a contact from an external source;

b) determine whether resources exist at the contact centre to efficiently handle the contact;

c) if a determination is made that the contact cannot be handled efficiently, issue a request to the network management unit to transfer the contact to a remote contact centre also connected to the network management unit;

d) receive from the network management unit an instruction to transfer the contact said instruction including sufficient information for the contact centre to determine routing information to the remote contact centre; and e) use said routing information, transferring the contact to said remote contact centre.

* * * * *